Patented Apr. 3, 1923.

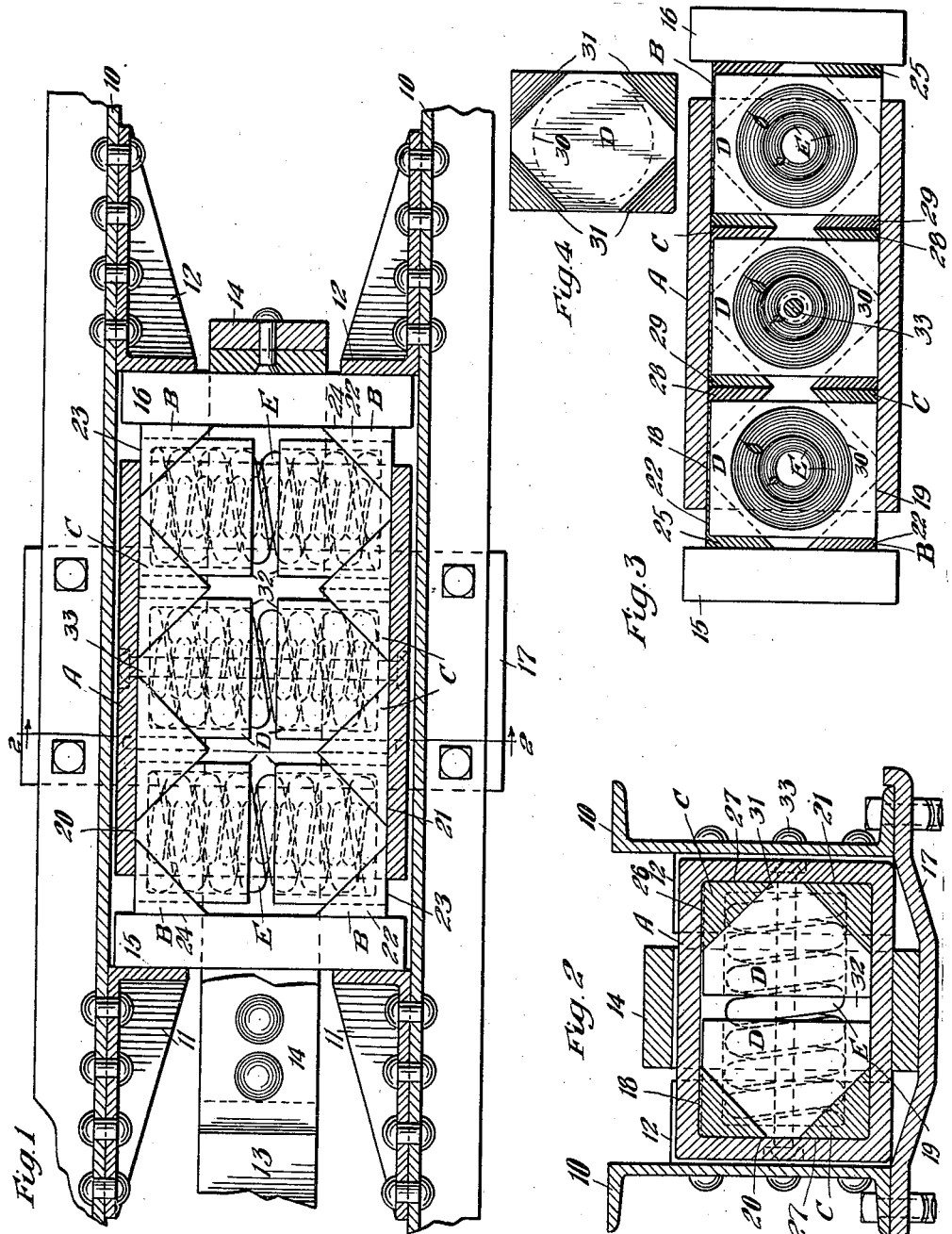

1,450,383

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed May 6, 1920. Serial No. 379,327.

*To all whom it may concern:*

Be it known that I, JOHN F. O'CONNOR, a citizen of United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

One object of this invention is to provide a high capacity friction shock absorbing mechanism especially adapted for railway draft riggings wherein a plurality of sets of devices are employed in tandem relation, the movable and cooperating friction elements presenting a large number of flat friction surfaces to thereby obtain high capacity.

The invention furthermore consists in the improvements in the parts and devices and in the novel combinations of the parts and devices herein shown, described and made the subject matter of claim.

In the drawing forming a part of this specification, Figure 1 is a horizontal longitudinal sectional view of a portion of a railway draft rigging showing my improvements in connection therewith. Figure 2 is a vertical transverse sectional view taken substantially on the line 2—2 of Figure 1. Figure 3 is a longitudinal vertical sectional view taken centrally of the mechanism but omitting the yoke and saddle plate and showing the end main followers in elevation. And Figure 4 is an end elevation of one of the friction spring caps.

In said drawing, 10—10 denote channel shaped center or draft sills of a railway car to the inner faces of which are secured front stop lugs 11 and rear stop lugs 12. A portion of a drawbar is indicated at 13, the same having secured thereto a yoke strap 14 of well known form which encircles the shock absorbing mechanism proper, and front and rear followers 15 and 16. The parts are adapted to be supported by a detachable saddle plate 17.

The improved shock absorbing mechanism, as shown, comprises, a casting or friction shell A; eight end wedges B—B; eight intermediate wedges C—C; six spring caps D—D; and three transversely arranged springs E.

The friction shell A is of hollow box-like form, open at each end. The interior of the shell provides upper and lower friction surfaces 18 and 19 and side friction surfaces 20 and 21, all of said surfaces being flat and extending the full length of the shell. As will be obvious, the side surfaces 20 and 21 are at right angles to the upper and lower surfaces 18 and 19.

Each of the end wedges B is provided with three surfaces 22, 23 and 24 which are arranged at right angles to each other, the surface 22 cooperating with a horizontal friction surface of the shell, the surface 23 with a vertical friction surface of the shell, and the surface or face 24 with the adjacent follower. In addition, each wedge B is provided with a diagonal or inclined wedging face 25, said wedge faces 25 coinciding with planes which intersect at an angle other than a right angle, all of the interior friction surfaces 18 to 21 of the shell A. As will be clear from the drawing, the wedges B are arranged in two end sets, four to each set, each wedge being disposed in a corner of the friction shell as shown in Figure 2.

Each of the intermediate wedges C comprises, in reality, two wedges similar to the end wedges B but arranged back to back. Each wedge C has two outer friction surfaces 26 and 27 at right angles to each other and cooperating with two intersecting interior friction surfaces of the shell, and two oppositely inclined wedge surfaces 28 and 29, the latter being best indicated in Figure 3.

Each of the friction spring caps D is of substantially rectangular outline and is centrally recessed to provide a cylindrical pocket 30 to accommodate a part of a spring E. At its outer end, that is the end adjacent the side wall of the friction shell, each cap D is beveled at its four corners as indicated at 31—31 to cooperate with the corresponding wedges B and C with which it is in engagement. As will be seen from an inspection of Figure 1, the inner opposed edges of the caps D are normally spaced as indicated at 32 so as to permit relative transverse movement toward each other and also said caps are suitably spaced from each other and from the followers to permit relative longitudinal movement between the parts.

With the construction shown, it is evident that, upon relative approach of the followers, the series of wedges B and C will move lengthwise of the shell and so approach each other as to, in effect, squeeze out the spring caps D, the latter being forced laterally toward each other and also moving lengthwise of the shell with the exception of the central set of spring caps D which are preferably held against longitudinal movement with respect to the shell by a bolt 33 extending transversely of the shell and upon which the caps are slidably mounted. By arranging the various friction surfaces as described, the wedges B and C are pressed out in directions diagonally of the shell so as to thereby obtain friction on all four interior surfaces of the shell. Friction will also be generated between the various wedges and the spring caps, there being a total of fifty-six sets of cooperating flat friction surfaces so that I obtain unusually high frictional capacity and large wearing areas. Furthermore, all of the parts are such as may be readily manufactured in the form of castings without the necessity of machining or employment of special skill in finishing or assembling the mechanism.

I claim:

1. In a friction shock absorbing mechanism, the combination with a friction shell having a plurality of interior longitudinally extending friction surfaces; of series of friction wedges arranged in tandem formation, each series being disposed in an angle formed by two of the shell friction surfaces and cooperable with the latter; pairs of friction spring caps also arranged in tandem formation and each cooperable with a plurality of said wedges; and a spring resistance between each pair of spring caps.

2. In a friction shock absorbing mechanism, the combination with a friction shell having an interior of rectangular cross section and provided with four longitudinally extending friction surfaces; of a plurality of friction-wedges symmetrically arranged with respect to the shell on the interior thereof, each friction-wedge having two outer friction surfaces at right angles to each other and cooperable with two intersecting friction surfaces of the shell, and a third wedge-friction surface inclined with respect to the axis of the shell and the friction surfaces thereof; a plurality of friction spring caps within the shell and cooperable with said friction-wedges; and spring means cooperable with said caps, each cap having four friction-wedge surfaces at the corners thereof cooperable with four friction-wedges.

3. In a friction shock absorbing mechanism, the combination with a friction shell having four interior longitudinally extending flat friction surfaces arranged at right angles to each other; of four series of friction-wedges within the shell, each series being located in a corner of the shell and cooperable with two friction surfaces of the shell; a plurality of sets of friction spring caps, said caps and wedges having cooperating wedge faces arranged at an angle to the axis of the shell; and transversely arranged springs interposed between the sets of caps.

4. In a friction shock absorbing mechanism, the combination with a friction shell of substantially rectangular formation and open at each end, the shell having four interior longitudinally extending friction surfaces intersecting at right angles; of a series of friction-wedges in each interior corner of the shell, each wedge having two outer friction surfaces cooperable with two intersecting friction surfaces of the shell and a wedge surface inclined to the axis of the shell; a plurality of pairs of friction spring caps, each cap having four wedge surfaces at the corners thereof at its outer ends and cooperable with four wedges; and transversely extending springs interposed between each pair of spring caps to yieldingly resist relative lateral approach thereof upon actuation of the mechanism.

5. In a friction shock absorbing mechanism; the combination with a longitudinally movable friction shell having a plurality of interior longitudinally extending friction surfaces angularly arranged with reference to each other; of a series of friction wedges arranged in tandem formation and each having a wedging friction surface inclined with respect to two adjacent friction surfaces of the shell, said wedges being movable relatively longitudinally of the shell and cooperable with the friction surfaces thereof, one end set of said friction wedges remaining stationary during a compression stroke; pairs of spring caps also arranged in tandem formation within the shell and each having wedging faces cooperable with the wedging friction surfaces of a plurality of said wedges, all of said spring caps being movable longitudinally and laterally of the shell; and a spring resistance between each pair of spring caps.

6. In a friction shock absorbing mechanism; the combination of a longitudinally movable friction shell having a plurality of interior longitudinally extending friction surfaces angularly arranged with reference to each other; of a series of friction wedges arranged in tandem formation and each wedge having a wedging friction surface inclined with respect to two of said angularly arranged friction surfaces, said friction wedges all being movable relatively longitudinally of the shell and cooperable with the friction surfaces thereof; pairs of friction spring caps also arranged in tandem formation within the shell and each having wedge faces cooperable with the wedging friction surfaces of a plurality of said wedges; and a spring resistance between each pair of spring caps.

In witness that I claim the foregoing I have hereunto subscribed my name this 30th day of Apr., 1920.

JOHN F. O'CONNOR.

Witness:
CARRIE GAILING.